US010552790B2

(12) United States Patent
Vasantham et al.

(10) Patent No.: US 10,552,790 B2
(45) Date of Patent: Feb. 4, 2020

(54) SHARD DETERMINATION LOGIC FOR SCALABLE ORDER AND INVENTORY MANAGEMENT ARCHITECTURE WITH A SHARDED TRANSACTIONAL DATABASE (71) Applicant: WAL-MART STORES, INC., Bentonville, AR (US)

(72) Inventors: Madhavan Kandhadai Vasantham, Foster City, CA (US); Sreekanth Sreedhararaj, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 297 days.

(21) Appl. No.: 15/488,223

(22) Filed: Apr. 14, 2017

(65) Prior Publication Data
US 2017/0220991 A1 Aug. 3, 2017

Related U.S. Application Data (63) Continuation of application No. 14/319,956, filed on Jun. 30, 2014, now Pat. No. 9,659,079, which is a
(Continued)

(51) Int. Cl.
*G06Q 10/08* (2012.01)
*G06F 16/27* (2019.01)
(Continued)

(52) U.S. Cl.
CPC ....... *G06Q 10/087* (2013.01); *G06F 16/2246* (2019.01); *G06F 16/278* (2019.01);
(Continued)

(58) Field of Classification Search
CPC .............. G06F 16/278; G06F 16/2228; G06F 16/2282; G06F 16/2425; G06Q 10/087
See application file for complete search history.

(56) References Cited

U.S. PATENT DOCUMENTS 7,856,440 B2  12/2010  Alpern
8,037,024 B1  10/2011  Bozkaya
(Continued)

FOREIGN PATENT DOCUMENTS

EP  2637111  9/2013

OTHER PUBLICATIONS

Amigue, Eugene. IBM Sterling Selling and Fulfillment Suite-9.2. 1—Scalability Capabilities (2013) Jul. 15, 2013.

*Primary Examiner* — A. Hunter Wilder
(74) *Attorney, Agent, or Firm* — Bryan Cave Leighton Paisner LLP (57) ABSTRACT A method for sharding a store order database and order management application is provided. The method may include a computer router associated with a store receiving, from a customer computer, a query regarding an order. The router may use resident shard determination logic to identify a database shard which pertains to the order and which is part of a store order database having multiple database shards. The router may transmit information regarding the order to a database server which implements the identified database shard and which implements an order management system application layer. The database server may process information regarding the order and transmit information regarding the order to the customer computer.

20 Claims, 7 Drawing Sheets

Related U.S. Application Data continuation-in-part of application No. 14/292,522, filed on May 30, 2014, which is a continuation-in-part of application No. 14/292,553, filed on May 30, 2014, now Pat. No. 10,043,208, which is a continuation-in-part of application No. 14/292,530, filed on May 30, 2014.

(51) Int. Cl.
*G06F 16/951* (2019.01)
*G06F 16/22* (2019.01)
*G06Q 30/06* (2012.01)
*G06F 7/24* (2006.01)

(52) U.S. Cl.
CPC ....... *G06F 16/951* (2019.01); *G06Q 30/0625* (2013.01); *G06F 7/24* (2013.01)

(56) References Cited

U.S. PATENT DOCUMENTS

| | | | |
|---|---|---|---|
| 8,189,964 | B2 | 5/2012 | Flynn |
| 8,229,945 | B2 | 7/2012 | Dinker |
| 8,380,738 | B2 | 2/2013 | Tatemura |
| 8,458,209 | B2 | 6/2013 | Clarke |
| 8,600,975 | B1 | 12/2013 | Cao |
| 8,666,991 | B2 | 3/2014 | Peters |
| 8,688,697 | B1 | 4/2014 | Nayar |
| 2007/0282979 | A1 | 12/2007 | Tuel |
| 2011/0202929 | A1 | 8/2011 | Schleimer |
| 2012/0254175 | A1 | 10/2012 | Horowitz |
| 2012/0310878 | A1 | 12/2012 | Vuksan |
| 2013/0073581 | A1 | 3/2013 | Sandholm |
| 2013/0221093 | A1 | 8/2013 | Patel et al. |
| 2013/0262531 | A1* | 10/2013 | Wilson ................ G06Q 10/087 707/812 |
| 2013/0290249 | A1 | 10/2013 | Merriman |
| 2014/0012814 | A1 | 1/2014 | Bercovici |
| 2014/0052689 | A1 | 2/2014 | Ficara et al. |
| 2014/0108421 | A1 | 4/2014 | Isaacson |
| 2014/0122510 | A1 | 5/2014 | Namkoong |
| 2014/0156632 | A1 | 6/2014 | Yu |
| 2014/0372489 | A1 | 12/2014 | Jaiswal |
| 2015/0161148 | A1 | 6/2015 | Randell et al. |
| 2015/0254307 | A1* | 9/2015 | Johnson ............. G06F 16/2425 707/763 |
| 2015/0302040 | A1* | 10/2015 | Amigud ............. G06F 16/2365 707/694 |
| 2015/0302046 | A1* | 10/2015 | Amigud ............. G06F 16/2282 707/700 |
| 2015/0302406 | A1 | 10/2015 | Pastore |
| 2015/0317349 | A1* | 11/2015 | Chao ................. G06F 16/2336 707/615 |

* cited by examiner

SHARD DETERMINATION LOGIC FOR SCALABLE ORDER AND INVENTORY MANAGEMENT ARCHITECTURE WITH A SHARDED TRANSACTIONAL DATABASE

RELATED PATENT APPLICATIONS

This patent application is a continuation of, and claims priority to, U.S. non-provisional patent application Ser. No. 14/319,956, filed on Jun. 30, 2014, titled: Shard Determination Logic For Scalable Order And Inventory Management Architecture With A Sharded Transactional Database, which is a continuation in part of U.S. non-provisional patent application Ser. No. 14/292,522, filed on May 30, 2014, also titled: Shard Determination Logic For Scalable Order And Inventory Management Architecture With A Sharded Transactional Database. U.S. non-provisional patent application Ser. No. 14/319,956 is also a continuation in part of U.S. non-provisional patent application Ser. No. 14/292,553, filed on May 30, 2014, titled: Smart Order Management and Database Sharding, and a continuation in part of U.S. non-provisional patent application Ser. No. 14/292,530, filed on May 30, 2014, titled: Smart Order Management and Database Sharding, all of which have the same inventors as the current patent application and the same assignee, and the contents of all of which are incorporated herein by reference.

FIELD OF THE DISCLOSURE

The present invention relates to online shopping and order management. In particular, examples of the present invention relate to a system to increase bandwidth for receiving customer orders and to reduce latency and improve customer satisfaction in placing orders and in interacting with a store order management system.

BACKGROUND

There are many benefits to using computer and internet technology; both for customers and for stores. Properly executed, internet technologies can provide additional venues for communicating with customer and can increase sales and revenue for a store. Many stores desire to allow customers to make, view, and manage orders via the internet in addition to making purchases from the store.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF EXAMPLES OF EMBODIMENTS

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how to improve bandwidth for allowing customers to place orders over the internet and to view and manage those orders over the internet. Particularly, the present disclosure describes how a computer system may be used to shard the application level software for an order management system to provide increased bandwidth for customer orders and to reduce latency and conflicts for a customer who is using the order management system.

Many retailers desire to provide online ordering and order management for customers. These systems, however, are able to serve a limited number of customers before becoming taxed to a point where customers are not able to place or manage orders without significant delay or without significant conflicts and technical problems in placing an order. Some retailers will experience a massive increase in the number of customers and online orders during particular periods of the year, such as holidays. As online ordering has become much more commonplace, particular retailers may experience tens of thousands of customer visits per minute and thousands of potential orders per minute. Current order management systems cannot handle such a load. Traditional order, inventory and returns management systems operate on a single database. This is primarily because customer sales orders are very closely related to inventory supply, availability, smart sourcing and customer returns.

Figure 1:
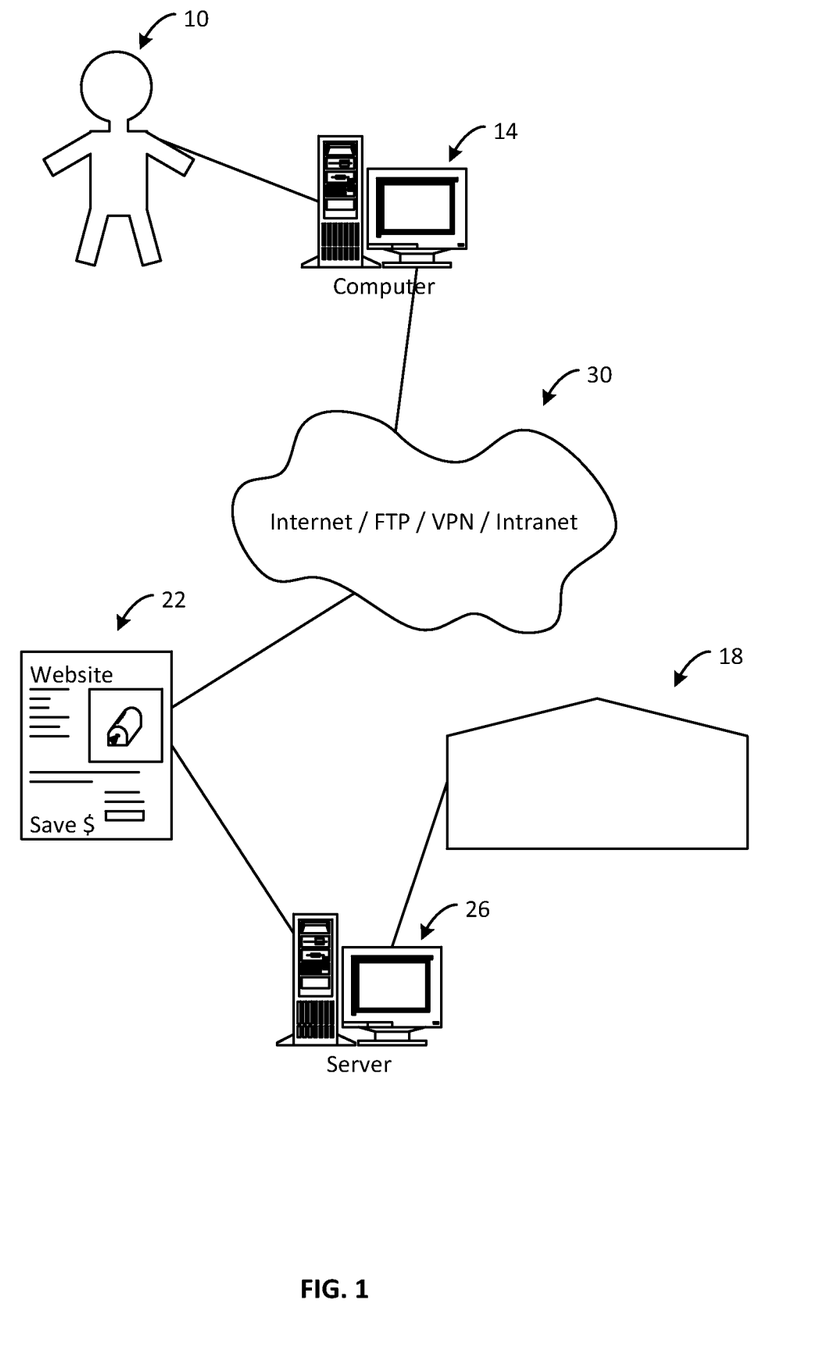
FIG. 1 is a schematic illustrating a computer system in context of an order management system.

Referring to FIG. 1, a computer system is utilized to provide an order management system for a store which is able to handle tens of thousands of online orders per minute for sustained periods of time. The computer system includes a sharded order database along with a sharded order management application layer, database management, router, and shard determination logic which allow sharding of a transactional database such as an order database. Tradition- ally, transactional databases have been monolithic databases due to the differing demands of transactional database compared to an informational database. A customer 10 may use a computer 14 to order products from a store 18. The store 18 may maintain a website 22 to allow customers 10 to order products online and then pick up the products at the store or have the products delivered to their home. The website 22 may be hosted by a store computer or server system 26 which forms an order management system. The customer computer 14 and the store server system 26 may be connected and enabled to communicate via the internet 30.

In many situations, a conventional store server would be able to handle the demands of customers 10 placing orders online and otherwise interacting with the server. A conventional order management system includes a single database which handles order, inventory, and returns due to the close relationship between these. For most stores, a conventional server may be sufficient. In some situations, however, a conventional server is not sufficient and may be replaced by an order management system 26 according to the present invention. For example, Walmart.com receives a significant amount of customer traffic during regular parts of the year. This customer traffic may include customers placing orders as well as customers later checking on order status, performing a return, etc. During holidays such as Christmas Walmart.com may receive upwards of 10,000 orders per minute for sustained periods of time. This high amount of customer orders combined with additional instances of customers checking on orders, etc. cannot be sustained by a conventional store server. As order volume grows exponentially, a different set of problems arise: heavy database contentions, long DB lock times, slow inventory supply processing, slower inventory reservations, slower inventory availability calls, and slower order processing, and these problems plague a traditional order database. Massive numbers of orders also brings additional risk if a single monolithic database handles complex processing of many orders.

Figure 2:
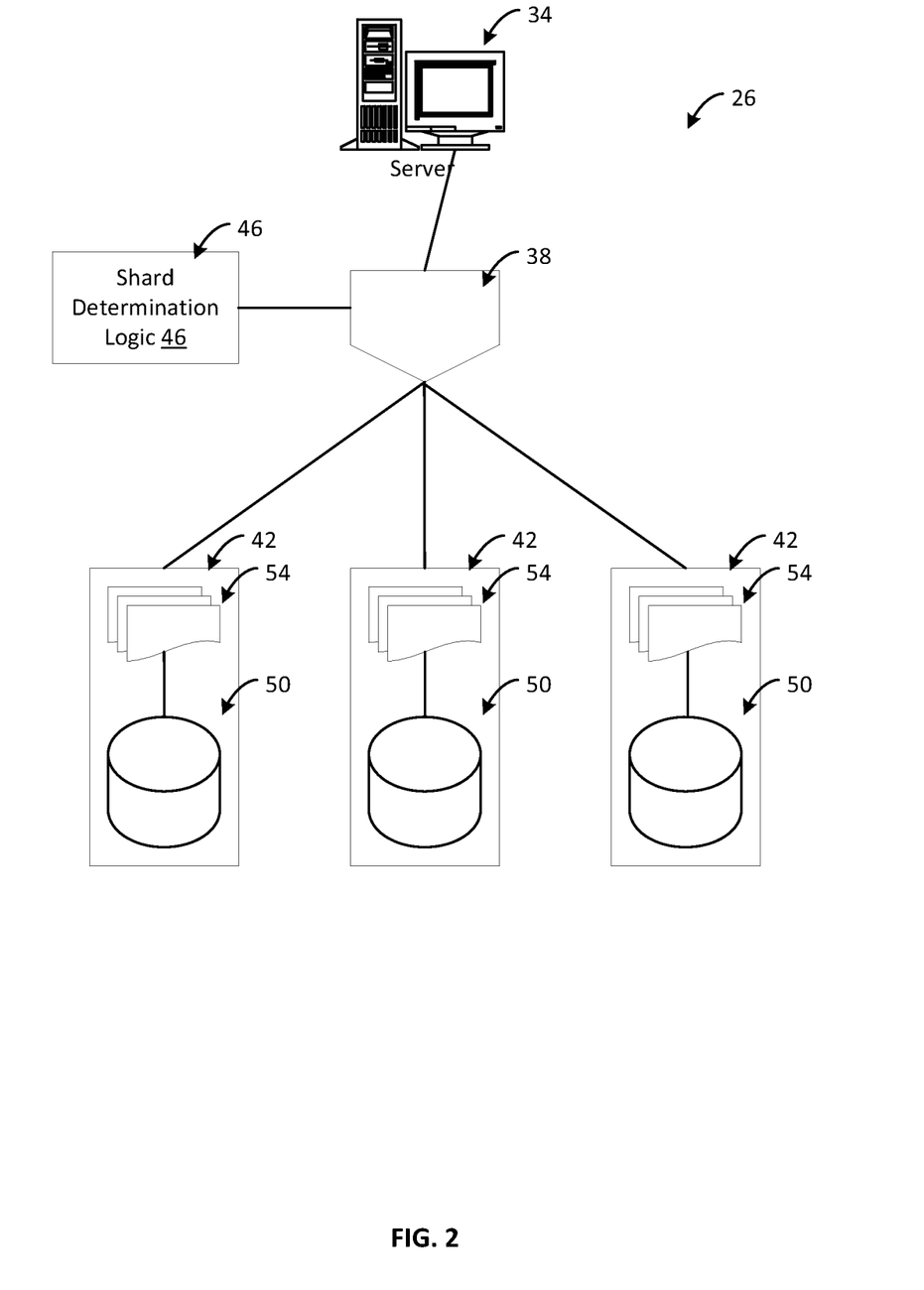
FIG. 2 is a schematic illustrating additional aspects of the computer system.

Referring to FIG. 2, a store order management system 26 may include one or more web servers 34 which host a store website 22 and provide a web portal through which a customer may place an online order with the store 18 or otherwise manage an account with a store 18. In some instances, the customer may be a vender who provides goods to the store and manages orders, returns, etc. as a client of the order management system 26. The web server 34 may facilitate the collection and presentation of information to a customer 10 in the process of interacting with the customer during shopping experiences. The server 34 may communicate with the customer 10 via a customer computer 14 and via the internet 30 or other communication systems. The customer computer 14 may be one of a variety of different electronic devices such as a smart phone, tablet computer, laptop, personal computer, etc. The customer 10 may use a computer 14 to provide information to the server 34 and to receive information from the server 34 in the context of online shopping and order management with the store 18.

The computer system 26 may also include other computing devices. Particularly, the system may include a router 38 which controls the flow of information to multiple database servers 42. Each of the multiple database servers 42 includes a shard 50 of a larger overall order database. The router 38 includes shard determination logic 46 which is used to determine which database server 42 (i.e. which database shard 50) should be accessed with regards to a particular customer request (i.e. a customer order, order lookup, return, etc.). The shard determination logic 46 may be present on the router 38 in the form of software or firmware. The router 38 may be implemented as a server which is configured to operate as a router or as a dedicated, single-purpose hardware router. In some instances, a single server may implement the functionality of both a web server/customer portal and a router.

Each database server 42 includes a database shard 50 which is part of a larger overall database that forms the store order database. Additionally, each database server 42 includes an order management system (OMS) application layer 54. The OMS application is distributed among the different database servers 42 such that each individual database server 42 executes the OMS application. The order management system 26 is thus sharded at the application level which each database server 42 running an instance of the OMS application software 54. Each database server 42 thus may operate independently in communicating with a particular customer to receive information from the customer and to provide information to the customer.

The customer computer 14 may be used to send and receive order information associated with one or more orders placed with the store 18. The software, hardware, and associated components of a computer system may be programmed and configured to implement one or more embodiments described herein. Customers 10 may communicate with a store web server 34 via a network connection or internet connection, internet 30, and webpage 22 to place orders with the store 18 and to manage orders with the store.

To participate in online or computer assisted shopping with the store, customers 10 may be invited to create an account with the store. Customers 10 who desire a store account will provide customer information such as identifying information, password information, contact information, etc. The store may store customer information in an electronic record associated with the customer 10 in a customer database, such as in web server 34. The server 34 may store information regarding the customer 10 and regarding customer preferences in the context of a customer account created by the customer. The server 34 may thus store contact information for the customer 10 (or for the electronic device 14 used by the customer and associated with the customer account). The server 34 may also store customer purchase history and purchase information associated with the customer 10.

The computer 14 (smart phone, tablet computer, laptop, desktop computer, etc.) typically includes a body or case which houses internal electronics such as a processor, storage, memory, battery, communications device, etc. The computer 14 includes a user interface such as screen, keyboard, mouse, etc. The various components of the computer 14 allow the computer 14 to perform the functions and display the data discussed herein.

The customer 10 may use the computer 14 to transmit order information to the server 10. The customer may log into a customer account at a store webpage 22 in order to place or manage an order. In placing an order, the customer may select items for purchase, select a shipping method and destination, and pay for the order. The customer may also manage orders. The customer may enter an order number or otherwise select an order which they have placed in the past and may perform subsequent tasks with that order. The customer may view order status to determine if the order has shipped, view delivery status, initiate a return for an item on the order, etc. The customer may perform these tasks via the computer 14 and via the webpage 22 and web server 34. The customer 10 may also receive information from the store via the computer 14.

The order management system 26 may receive information from the customer computer 14 and may provide information to the customer computer 14. In providing a system 26 which utilizes a sharded OMS application 54 and a sharded database 50, the system 26 functions in a way which is transparent to the customer 10.

The web server 34 may provide a communications portal with the customer as it receives information from and provides information to the customer 10 via an internet browser or the like. The router 38 routes information to and from an appropriate database server 42 which is housing a shard of the overall store order database. The router 38 includes shard determination logic 46 in the form of software or firmware to determine which shard (and thus which database server 42) should transmit/receive information in communicating with the customer. The use of a router 38 with shard determination logic 46 keeps the shard determination logic outside the database boundary. Sharding logic outside the database ensures that the processing of orders is not impacted by system maintenance, although the maintenance will be challenging, as it has to co-exist with the complexity of logical separation of orders.

Customer requests will always be intercepted by a routing layer 38, which will determine the appropriate shard 50 using the data in the customer request. Shard determination logic 46 is responsible for the reliability of the identification. One of the advantages of such mechanism is the ability to horizontally scale the complete database and OMS application to support the load and volume of a particular retailer. One particular challenge is to maintain the consistency of services offered by each of the shards 50. Any post production fixes and updates to the OMS application layer 54 or database will need to be managed well to make sure that each of these app shards are reflecting the same version of fix or code. One of the performance benefits of this mechanism is that it improves the reads and writes in a specific application exponentially. The only additional overhead injected by the system 26 is that the read or write for a particular customer request will need to go through the shard determination logic 46. It is thus advantageous to keep the shard determination logic 46 light.

For new orders being placed by a customer, the shard determination logic 46 may use different determination methods. A random determination method may provide that every order is randomly routed to each of the shards 50. A round robin (dynamic, weighted) determination may provide that every order is distributed round robin fashion into the shards 50 such that a first order goes to the first shard, the second order goes to the second shard and so on. A modulo determination provides that the determination of the shard for an order is done by modulo operation on the sequence of the order. The result of $(a-(n*int(a/n)))$ is the shard number for an order n. A predictive/logical shard determination method may be used whereby the data within an order is used by the shard determination logic 46 to select the shard 50. For example all orders from California goes to shard one or all store order goes to shard two etc.

As a customer 10 may have on order history with many different existing or past orders, different existing orders pertaining to a single customer may be located in different database shards 50 and thus different database servers. A web server 34 may store customer accounts which include order information. Each order may be identified by an order identification number. The order may also include information to identify a database shard 50 on which that particular order may be stored. Such shard identifying information may be a data field associated with an order, or may be part of the order identification number itself, such as being an alphanumeric digit which is part of the order number, such as the first digit in the order number. A customer 10 may select an order in a customer account and the router 38 may determine which database shard 50 is associated with the selected order. Thus, the order management system 26 may draw order information from multiple database shards 50 while providing information to a customer.

The database server 42 may receive information regarding an order and may process or analyze the information. The server 42 may query a product database and other necessary databases in handling order transactions. The server 42 may save purchase data in a database record associated with the customer 10 in the database shard 50.

Figure 3:
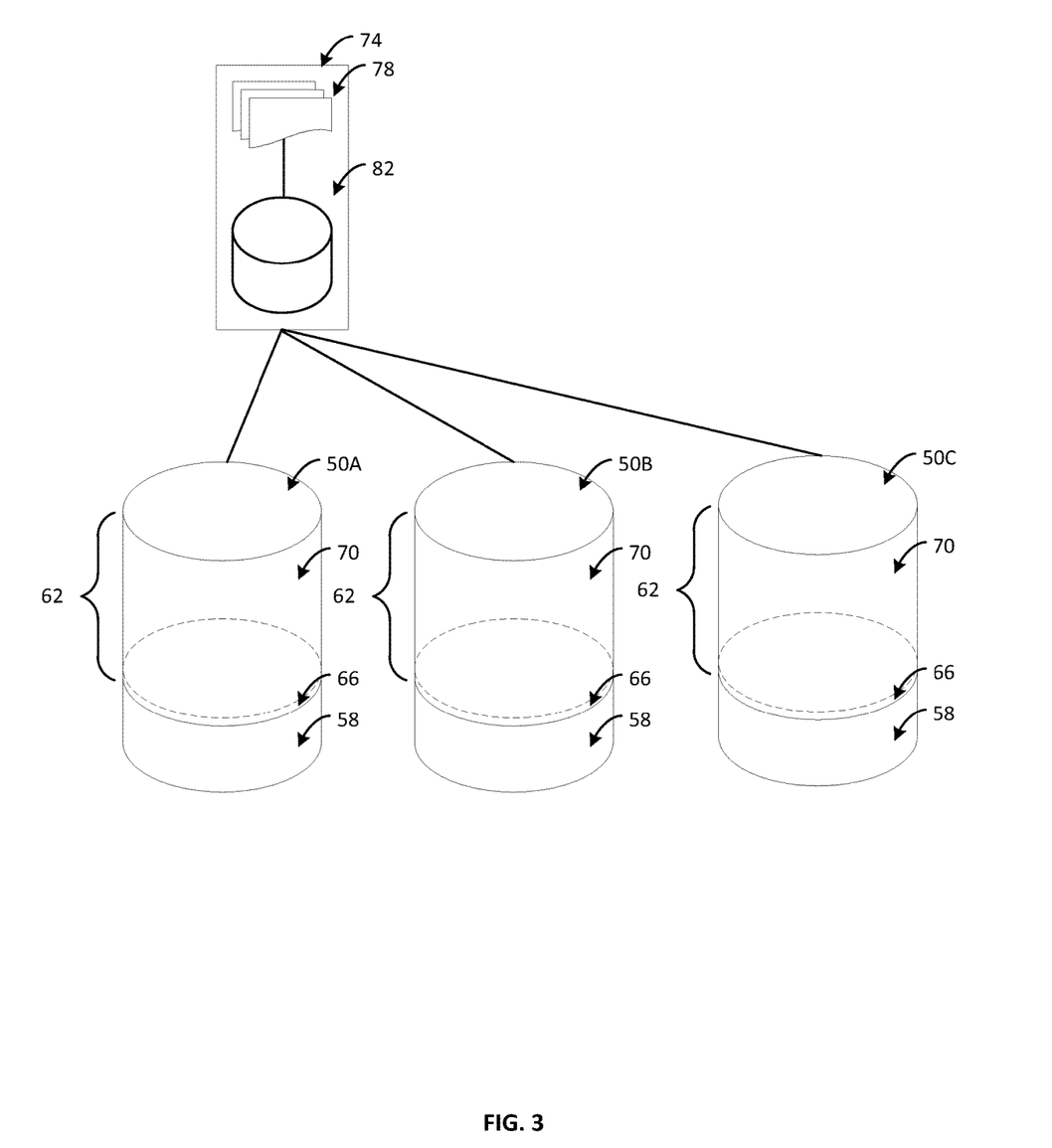
FIGS. 3, 4, and 5 are schematics illustrating various aspects of database shards forming part of the computer system.
Figure 4:
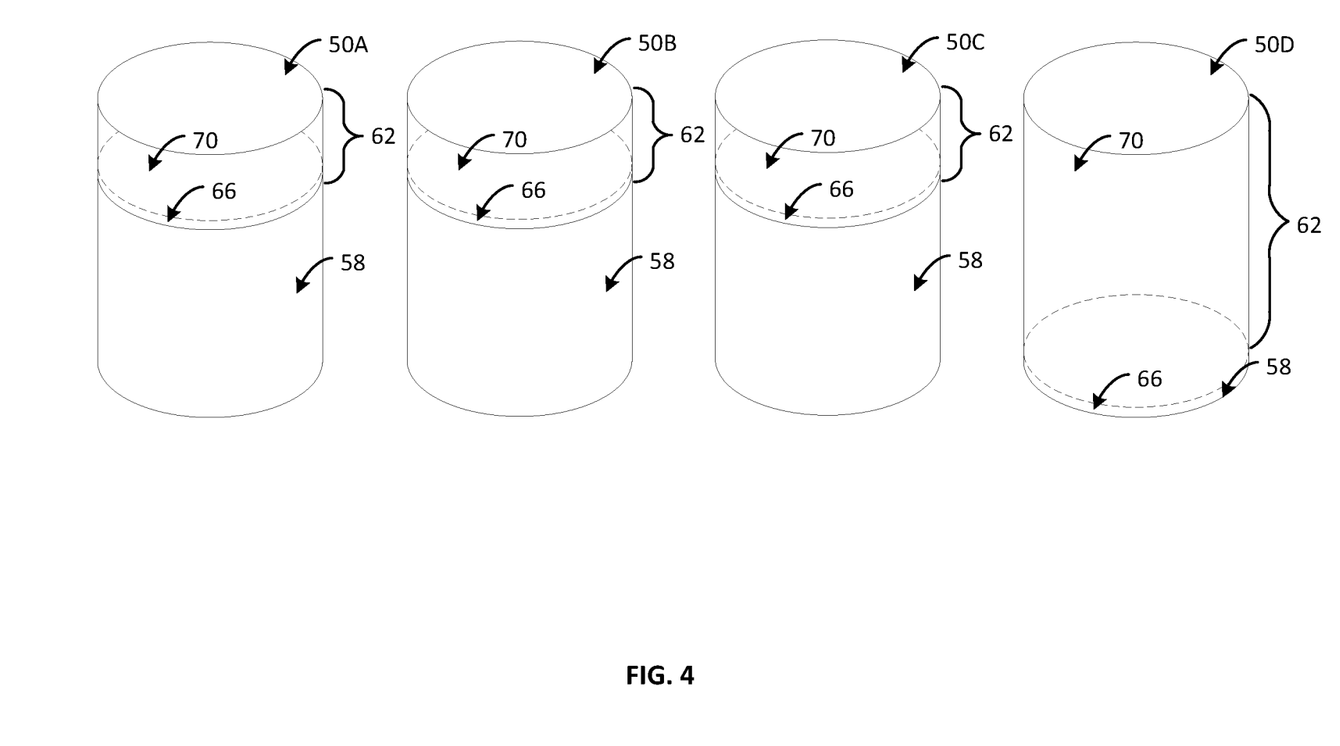

Referring now to FIG. 3, database shards may be managed to reduce the load on the router 38 and the shard determination layer 46 to thereby promote a system which does not have a heavy overhead or unnecessarily affect the speed of communications between a customer computer 14 and a database shard 50. FIG. 3 shows three database shards 50A, 50B, 50C in an order management system 26. FIG. 4 shows a single shard 50 in greater detail. Each database shard 50 is typically implemented among an array of hard drives on a database server 42. Each database shard 50 includes a used portion 58, and an unused portion 62 representing available capacity in the shard. The unused portion 62 of the shard 50 includes a buffer capacity 66 which is necessary for the shard to perform read, write, and buffering operations during normal operation of the database server 42. The unused portion 66 of the shard 50 includes an available storage capacity 70 which has a storage capacity equal to the unused shard capacity 62 minus the buffer capacity 66.

In operation, the router 38 and shard determination logic 46 will distribute customer order data among the shards 50 so that the shards 50 have similar used capacities 58 and unused capacities 62. The shard key may have a shard number (such as SH-1) which avoids the use of lookup tables or other more complex manners of the shard determination logic 46 determining a particular shard 50. In this manner, the router 38 and shard determination logic 46 operate with minimal intrusion into the communication between customer computer 14 and database server 42. The order management system (such as an individual database server 42) may monitor the order data stored on each shard 50. As past orders get older, they will reach an age where items from an order are no longer returnable. Orders which are no longer returnable typically no longer have a need to be modified. When an order is no longer returnable, a database server 42 may transmit the order data to an archive server 74 (which may include an order management archive application layer 78 and database storage 82) and the archive server 74 may store the order information. The database server 42 may then delete the order information from the shard 50. This will maintain the size of the used data 58 on the database shard 50 to a steady state quantity of data and remove old order data from the active OMS sharded database. The steady state amount of used data 58 on a shard 50 will equal the number of orders per day times the number of days until an order is not returnable divided by the number of shards 50. The size of the used data 58 on a shard 50 will thus grow with current order volume rather than with past order quantity.

As order volume grows, the used data 58 on a shard 50 will grow and the available capacity 62 on the shard 50 will diminish. The order management system 26 will monitor the available capacity 62 on the shards 50. This may be performed by the database servers 42. A threshold of necessary available capacity 70 may be set, such as 180 days. When the available capacity 62 is greater than the necessary capacity 70 for 180 days of operation plus the necessary buffer capacity 66 the shard 50 is operating with sufficient storage capacity. When the available capacity 62 is reduced to where the available capacity is equal to or less than the necessary storage capacity 70 for 180 days of operation (i.e. the threshold) plus the buffering capacity 66, the database server 42 or order management system 26 may signal that it is necessary to add an additional database server 42 and database shard 50.

Figure 5:
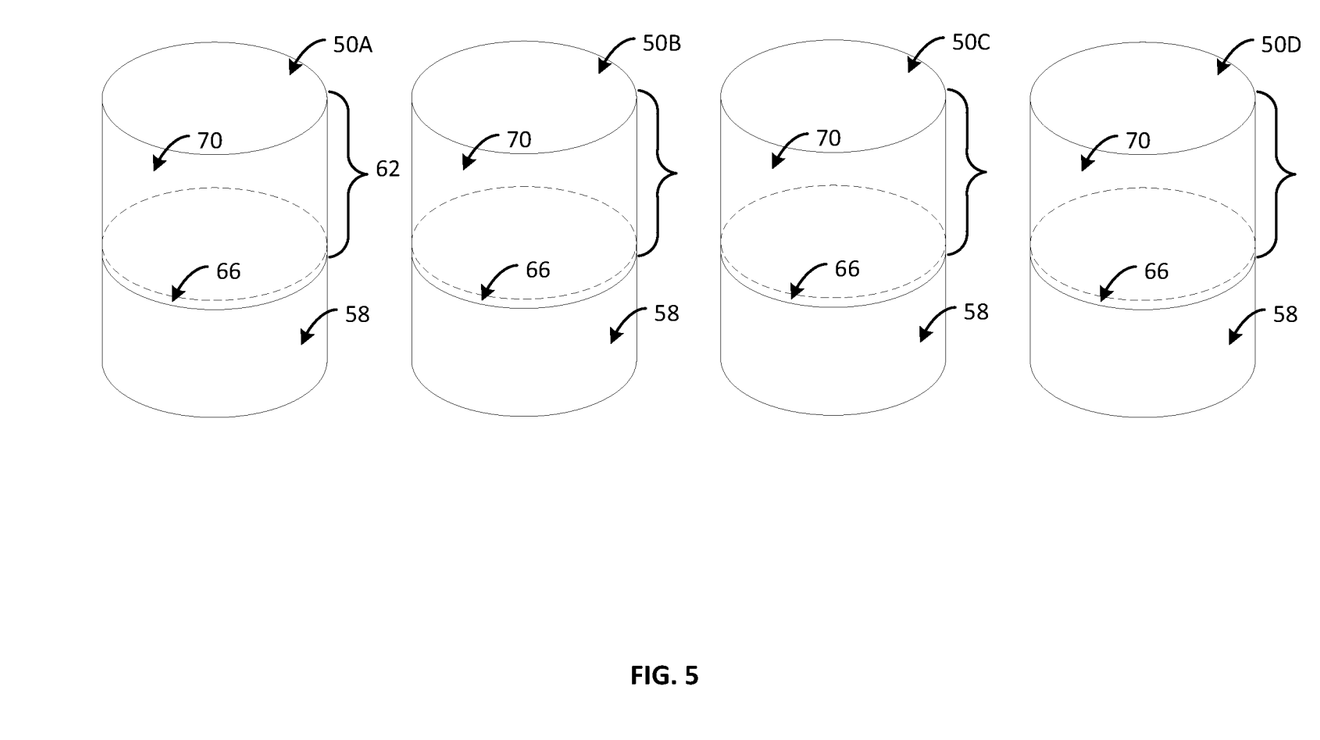

Referring now to FIG. 4, a new shard 50D may thus be added to the system 26. The new shard 50D will be empty, and will be added as part of a new database server 42 with includes the shard 50 and OMS application layer 54. Once a new shard 50D is added to the system 26, the shard determination logic is modified to address the new shard 50D along with the existing shards 50A, 50B, 50C. The router 38 and shard determination logic 46 will thus distribute new orders among all shards 50. The old shards 50A, 50B, 50C will thus receive a reduced amount of orders (approximately equal to N/(N+1) where N is the old number of shards) due to the presence of the new shard. This will thus reduce the necessary order capacity 70 and allow the shards 50 to operate at an acceptable capacity level without moving any data from the shard 50. Additionally, the used capacity 58 on an old shard 50A, 50B, 50C will naturally diminish and the available capacity 62 will increase as older orders are archived to the archive server 74. Thus, the used capacity 58 on an old shard 50A, 50B, 50C will be reduced to a new steady state level (reflecting the current order volume and the current number of shards 50 with the new shard 50D) after a period of time equal to the time period for archiving old orders to the archive server 74 (i.e. the time period after which orders cannot be returned). In this manner, the old shards 50A, 50B, 50C are naturally brought back down below their maximum used capacity/minimum free space threshold and there is no need to transfer order data between shards to balance the system. After a time period equal to the archiving time threshold for old orders, each shard 50 in the system 26 will be balanced. FIG. 5 shows such a state where each shard 50A, 50B, 50C, 50D is balanced.

This system 26 significantly improves performance. Since active order data is never moved between shards, the shard determination logic 46 does not need excessive complexity to track/determine order data and the sharded database does not increase the time for communications between a customer computer 14 and a database server 42 or archive server 74. The shard determination logic 46 may route new orders between shards 50. Order information may itself indicate a database shard (such as by using a shard number as a particular digit in the order number or placing the shard number in a data field associated with the order) and old orders (orders over a predetermine time period such as the time period for return) may be automatically moved to an archive server 74 and the shard determination logic may automatically determine that an old order is in the archive server 74 by date or the shard identification data associated with the order may be modified at this point.

Figure 6:
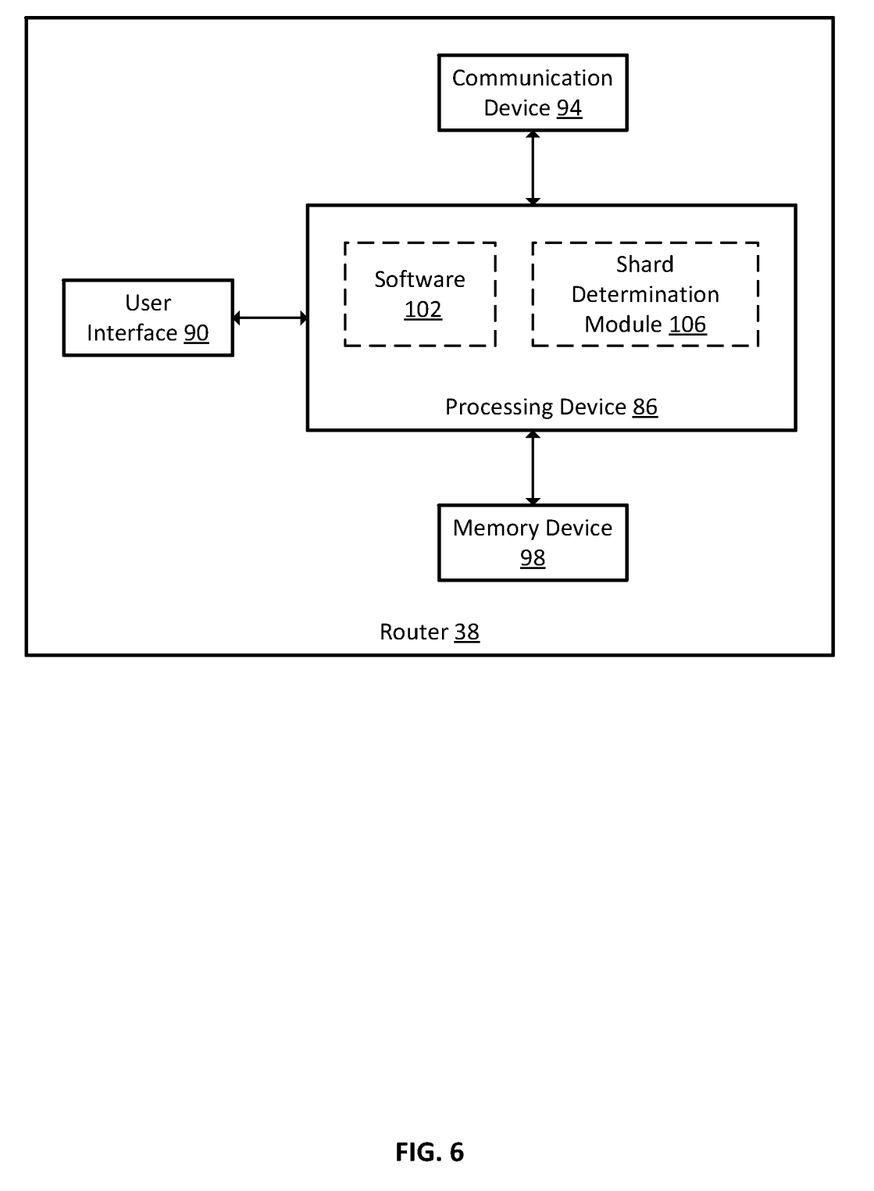
FIG. 6 is a schematic illustrating example components of the router.

Referring now to FIG. 6, a schematic illustrating example components of the router 38 is shown. As discussed, the router 38 may be a programmed computer or a dedicated hardware implementation. The router 38 includes a processing device 86, a user interface 90, a communication device 94, and a memory device 98. It is noted that the router 38 can include other components and some of the components are not required.

The processing device 86 can include memory, e.g., read only memory (ROM) and random access memory (RAM), storing processor-executable instructions and one or more processors that execute the processor-executable instructions. In embodiments where the processing device 86 includes two or more processors, the processors can operate in a parallel or distributed manner. The processing device 86 can execute the operating system of the router 38. In one example, the processing device 86 may also executes a software module 102 and a shard determination module 106 (which includes the shard determination logic 46).

The user interface 90 is a device that allows a user to interact with the router 38. While one user interface 90 is shown, the term "user interface" can include, but is not limited to, a touch screen, a physical keyboard, a mouse, etc. The communication device 94 is a device that allows the router 38 to communicate with another device, e.g., the servers 42 and 74. The communication device 94 can include one or more wireless transceivers for performing wireless communication and/or one or more communication ports for performing wired communication. The memory device 98 is a device that stores data generated or received by the router 38. The memory device 98 can include, but is not limited to, a hard disc drive, an optical disc drive, and/or a flash memory drive.

The shard determination module 106 allows router 38 to analyze information regarding a query from a customer computer 14 (which may be a new order or a request to view or modify an existing order) and to identify a shard 50 pertaining to that order. The shard determination module 106 also allows the router 38 to execute one or more other tasks as discussed herein. Particularly, the shard determination module 106 facilitates the communication between the computer 14, router 38 and server 42 or server 74.

A computer in the order management system may store a customer database. In some instances, the router 38 or a web server 34 or a dedicated customer database server may store a customer database. The customer database may store information regarding specific customers, such as customer account information, customer contact information and preferences, customer order history, etc. The customer database may be queried by various devices in the order management system to record or retrieve information regarding customer orders.

Figure 7:
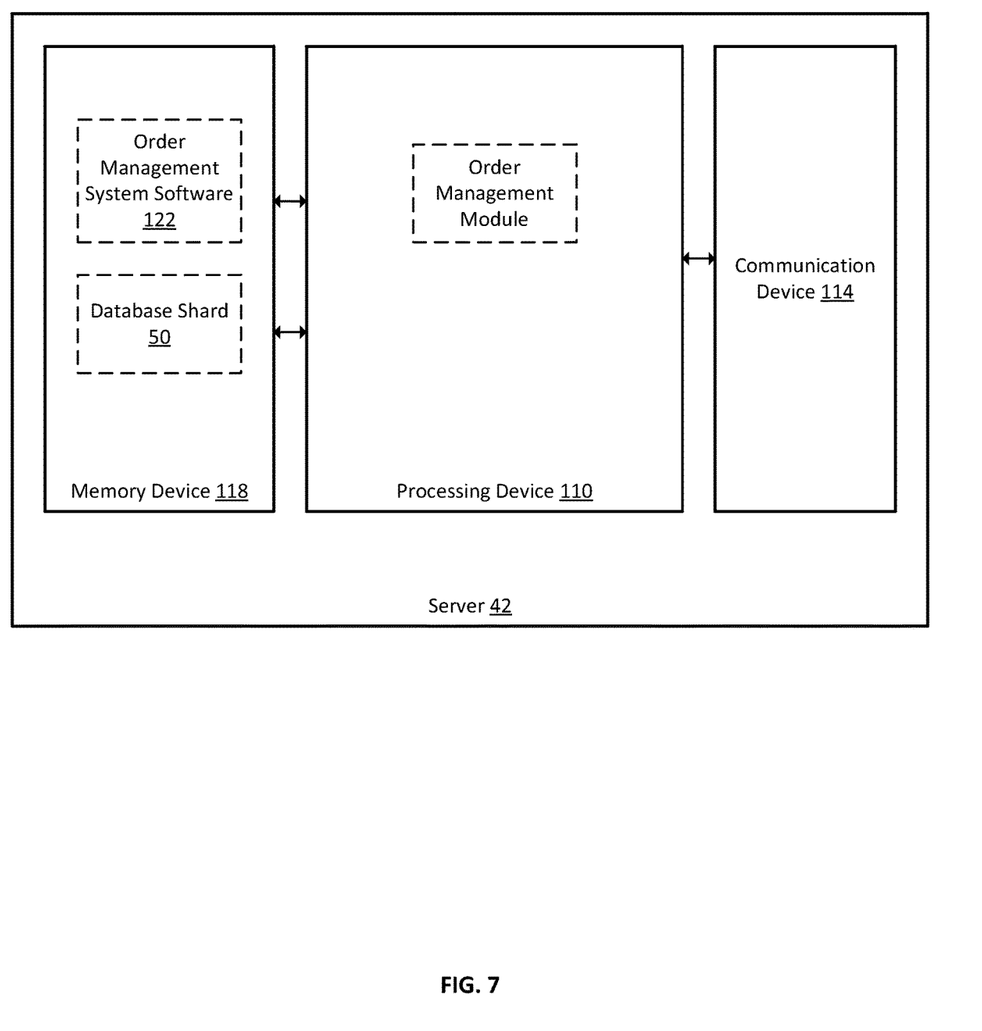
FIG. 7 is a schematic illustrating example components of a server.

Referring now to FIG. 7, a schematic illustrating example components of a server 42 is shown. The server 42 may be programmed to perform one or more functions at the request of the router 38 and, according to various computing models, may execute some or all of the functions associated with operation of the order management system 26. The server 42 may include a processing device 110, a communication device 114, and a memory device 118.

The processing device 110 can include memory, e.g., read only memory (ROM) and random access memory (RAM), storing processor-executable instructions and one or more processors that execute the processor-executable instructions. In embodiments where the processing device 110 includes two or more processors, the processors can operate in a parallel or distributed manner. In the illustrative embodiment, the processing device 110 executes aspects of the order management system 26.

The communication device 114 is a device that allows the server 42 to communicate with another device, e.g., the router 38. The communication device 114 can include one or more wireless transceivers for performing wireless communication and/or one or more communication ports for performing wired communication.

The memory device 118 is a device that stores data generated or received by the server 42. The memory device 118 can include, but is not limited to, a hard disc drive, an optical disc drive, and/or a flash memory drive. Further, the memory device 118 may be distributed and located across multiple disc drives. The memory device 118 is accessible to the processing device 110. In some embodiments, the memory device 110 stores data such as order management system software 122 and an order database shard 50.

In some embodiments, the database shard 50 can store information associated with customer orders such as products, UPC codes, descriptions, prices, etc. The database shard 50 may be queried by the processing device 110 and may provide information to the processing device to facilitate the operation of an order management system 26. An archive server 74 may have similar components as a database server 42.

The system is advantageous as it provides an order management system which can accommodate massive order volumes such as tens of thousands of orders per minute without the overloading, delays, and loss of bandwidth to take orders that happen with a conventional system. The order management application layer, shard determination logic, and database management techniques allow a transactional database to be sharded and allow the transactional database to be maintained at an operational size. The system can be implemented on existing servers and is transparent to customers.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A scalable computer system for managing inventory in a store, the scalable computer system comprising:
 a sharded store inventory database associated with the store, the sharded store inventory database comprising:
   a first inventory database shard in a first inventory database server, the first inventory database shard having first inventory data for a first group of items sold by the store;
   a second inventory database shard in a second inventory database server, the second inventory database shard having second inventory data for a second group of items sold by the store, the second group of items being different from the first group of items;
 a store inventory management computer system comprising:
   a computer processor;
   memory connected to the computer processor;
   a plurality of database servers each comprising:
     an order management system application layer used to horizontally scale the sharded store inventory database by signaling to add an additional inventory database shard based on an available capacity of a particular inventory database shard of the sharded store inventory database falling below a predetermined threshold capacity, wherein a router distributes new orders to the first inventory database shard, the second inventory database shard, and the additional inventory database shard within the sharded store inventory database, and wherein the plurality of database servers comprise the first inventory database server and the second inventory database server; and an inventory shard determination module programmed to:
receive a query regarding an item sold by the store;
identify an identified inventory database shard upon which inventory data for the item is stored, wherein the identified inventory database shard is one of the first inventory database shard or the second inventory database shard; and
retrieve information about the item from the identified inventory database shard.

2. The scalable computer system of claim 1, wherein the inventory shard determination module is further programmed to:
determine a product category associated with the item; and
identify the identified inventory database shard based on the product category.

3. The scalable computer system of claim 1, wherein the inventory shard determination module is further programmed to:
determine that the item is sold online or in a brick and mortar store location; and
identify the identified inventory database shard based on where the item is sold.

4. The scalable computer system of claim 1, wherein the inventory shard determination module is further programmed to:
determine that the item is sold by the store or is sold by a third party through the store; and
identify the identified inventory database shard based on whether the item is sold by the store or is sold by the third party through the store.

5. The scalable computer system of claim 1, wherein:
the first group of items sold by the store and the second group of items sold by the store are organized into a tree structure according to a type of item;
the sharded store inventory database comprises individual database shards associated with different leaf nodes corresponding to different item types; and
the inventory shard determination module is further programmed to identify the identified inventory database shard based on a leaf node associated with the item, wherein the leaf node is one of the different leaf nodes.

6. The scalable computer system of claim 5, wherein a webpage categorizes multiple items according to the tree structure.

7. The scalable computer system of claim 1, wherein:
inventory shard identification data is associated with item information;
a customer selection of a displayed item on a webpage transmits inventory shard identification data to the inventory shard determination module; and
the inventory shard determination module is further programmed to provide inventory information for the displayed item to the customer via the webpage.

8. The scalable computer system of claim 1, wherein:
inventory shard determination data is contained within identification data for each item of the first group of items and the second group of items;
the query transmits the identification data for the each item to the inventory shard determination module; and
the inventory shard determination module identifies the identified inventory database shard upon which inventory data is stored from the identification data.

9. The scalable computer system of claim 1, wherein the store makes sales (i) at a physical retail location, (ii) through an online storefront, and (iii) through an online marketplace where third party goods are sold to customers.

10. The scalable computer system of claim 1, wherein:
the first group of items sold by the store correspond to first items which have been sold by the store at a physical retail location; and
the second group of items sold by the store correspond to second items which have been sold by the store through an online storefront.

11. The scalable computer system of claim 10, wherein the sharded store inventory database further comprises:
a third inventory database shard in a third inventory database server, the third inventory database shard having data for a third group of items sold by the store, the third group of items sold by the store corresponding to third party goods which have been sold through an online marketplace, the third group of items sold by the store being different from the first group of items sold by the store, and the third group of items sold by the store being different from the second group of items sold by the store, wherein the plurality of database servers further comprises the third inventory database server.

12. The scalable computer system of claim 1, wherein the inventory shard determination module is further programmed to:
receive a first query regarding a first order to purchase a first ordered item from the store, wherein the first ordered item is one of the first group of items sold by the store;
identify a first database shard associated with the first order;
communicate data regarding the first order to the first database shard;
receive a second query regarding a second order to purchase a second ordered item from the store, wherein the second ordered item is one of the second group of items sold by the store;
identify a second database shard associated with the second order; and
communicate data regarding the second order to the second database shard.

13. The scalable computer system of claim 12, wherein the inventory shard determination module is further programmed to:
receive a third query regarding a third order to purchase a third ordered item, wherein the third ordered item comprises third party goods;
identify a third inventory database shard associated with the third order; and
communicate data regarding the third order to the third inventory database shard.

14. A scalable computer system for managing orders in a store, the scalable computer system comprising:
a sharded store order database comprising:
a first order database shard in a first order database server, the first order database shard having first order data for a first group of orders, the first group of orders corresponding to first items which have been sold by the store at a physical retail location;
a second order database shard in a second order database server, the second order database shard having second order data for a second group of orders, the second group of orders corresponding to second items which have been sold by the store through an online storefront, the second group of orders store being different from the first group of orders; and
a third order database shard in a third order database server, the third order database shard having third order data for a third group of orders, the third group of orders corresponding to third party goods which have been sold through an online marketplace, the third group of orders store being different from the first group of orders and the third group of orders store being different from the second group of orders;
a store order management computer system comprising:
a computer processor;
memory connected to the computer processor;
a plurality of database servers each comprising:
an order management system application layer used to horizontally scale the sharded store order database by signaling to add an additional order database shard based on an available capacity on a particular order database shard of the sharded store order database falling below a predetermined threshold capacity, wherein a router distributes new orders to the first order database shard, the second order database shard, the third order database shard, and the additional order database shard within the sharded store order database, and wherein the plurality of database servers comprise the first order database server, the second order database server, and the third order database server; and
an order shard determination module programmed to:
receive a first query regarding a first order of the first group of orders to purchase a first ordered item from the store at the physical retail location, wherein the first ordered item is one of the first items; identify the first order database shard as being associated with the first order;
communicate the first order data regarding the first order to the first order database shard;
receive a second query regarding a second order of the second group of orders to purchase a second ordered item from the store through the online storefront, wherein the second ordered item is one of the second items;
identify the second order database shard as being associated with the second order;
communicate the second order data regarding the second order to the second order database shard;
receive a third query regarding a third order of the third group of orders to purchase a third ordered item through the online marketplace, wherein the third ordered item is one of the third party goods;
identify the third order database shard as being associated with the third order; and
communicate the third order data regarding the third order to the third order database shard.
15. The scalable computer system of claim 14, wherein the order shard determination module is further programmed to:

receive a new order from a customer to purchase an item;
identify a location where the customer resides;
identify a location order database shard which corresponds to the location where the customer resides; and
store data regarding the new order on the location order database shard.
16. The scalable computer system of claim 14, wherein the order shard determination module is further programmed to:
receive a new order from a customer to purchase an item;
identify an identified database shard for the new order;
assign the new order to the identified database shard;
store data regarding the new order on the identified database shard;
embed a code associated with the identified database shard in an order identification number for the new order; and
store the order identification number in an account associated with the customer.
17. A computer system for managing orders and inventory in a store, the computer system comprising:
a sharded store order database comprising:
a first order database shard in a first order database server, the first order database shard having first inventory data for a first group of orders, the first group of orders corresponding to first items which have been sold by the store; and
a second order database shard in a second order database server, the second order database shard having second order data for a second group of orders, the second group of orders corresponding to second items which have been sold by the store, the second group of orders store being different from the first group of orders;
a store order management computer system comprising:
a computer processor;
memory connected to the computer processor;
a plurality of database servers each comprising:
an order management system application layer used to horizontally scale the sharded store order database signaling to add an additional order database shard based on an available capacity on a particular order database shard of the sharded store order database falling below a predetermined threshold capacity, wherein a router distributes new orders to the first order database shard, the second order database shard, and the additional order database shard within the sharded store order database, and wherein the plurality of database servers comprise the first order database server and the second order database server; and
an order shard determination module programmed to:
receive a query regarding an order to purchase an item;
identify an identified order database shard associated with the order; and
communicate data regarding the order to the identified order database shard;
wherein:
the first order database shard stores information for purchases made in a physical retail location;
the second order database shard stores information for online purchases; and
the order shard determination module is further programmed to:
receive a query regarding a purchase made by a customer;

determine that the purchase was made online or in the physical retail location;
identify an identified database shard associated with the purchase; and
retrieve data regarding the purchase from the identified database shard.

18. The computer system of claim 17, wherein the order shard determination module is further programmed to:
receive a third query regarding a third order to purchase a third ordered item, wherein the third ordered item is one of third party goods;
identify a third order database shard associated with the third order; and
communicate data regarding the third order to the third order database shard.

19. The computer system of claim 17, wherein the order shard determination module is further programmed to:
receive a new order from a customer to purchase an item;
identify a new identified database shard for the new order; and
assign the new order to the new identified database shard.

20. The computer system of claim 19, wherein the order shard determination module is further programmed to:
store data regarding the new order on the new identified database shard;
embed a code associated with the new identified database shard in an order identification number for the new order; and
store the order identification number in an account associated with the customer.

* * * * *